(12) United States Patent
Krajnovich et al.

(10) Patent No.: US 7,400,473 B1
(45) Date of Patent: Jul. 15, 2008

(54) SLIDER WITH INDEPENDENT FLY-HEIGHT ADJUSTMENT OF READER AND WRITER

(75) Inventors: Douglas J. Krajnovich, Santa Clara, CA (US); Erhard Schreck, San Jose, CA (US); Kaz Saito, San Jose, CA (US); Don Brunnett, Pleasanton, CA (US)

(73) Assignee: Maxtor Corporation, Scotts Valley, CA (US)

( * ) Notice: Subject to any disclaimer, the term of this patent is extended or adjusted under 35 U.S.C. 154(b) by 362 days.

(21) Appl. No.: 11/048,998

(22) Filed: Feb. 1, 2005

Related U.S. Application Data

(60) Provisional application No. 60/587,393, filed on Jul. 13, 2004.

(51) Int. Cl.
G11B 5/56 (2006.01)
G11B 5/39 (2006.01)

(52) U.S. Cl. .................... 360/294.7; 360/317

(58) Field of Classification Search .............. 360/294.7, 360/128, 317
See application file for complete search history.

(56) References Cited

U.S. PATENT DOCUMENTS

| | | | |
|---|---|---|---|
| 5,862,015 A | 1/1999 | Evans et al. | |
| 5,880,899 A | 3/1999 | Blachek et al. | |
| 5,959,801 A | 9/1999 | Gillis et al. | |
| 5,965,840 A | 10/1999 | Nagarajan et al. | |
| 5,991,113 A | 11/1999 | Meyer et al. | |
| 6,011,239 A | 1/2000 | Singh et al. | |
| 6,195,219 B1 | 2/2001 | Smith | |
| 6,344,949 B1 * | 2/2002 | Albrecht et al. | 360/236.5 |
| 6,452,740 B1 | 9/2002 | Ghoshal | |
| 6,798,613 B1 * | 9/2004 | Krajnovich et al. | 360/97.01 |
| 6,920,020 B2 * | 7/2005 | Yamanaka et al. | 360/317 |
| 6,963,464 B2 * | 11/2005 | Xu et al. | 360/75 |
| 7,068,468 B2 * | 6/2006 | Kamijima | 360/128 |
| 7,133,254 B2 * | 11/2006 | Hamann et al. | 360/126 |
| 7,184,246 B2 * | 2/2007 | Sasaki et al. | 360/294.7 |
| 7,203,035 B2 * | 4/2007 | Koide et al. | 360/294.7 |
| 7,324,299 B1 * | 1/2008 | Schreck et al. | 360/75 |
| 2001/0046108 A1 * | 11/2001 | Lewis et al. | 360/294.7 |
| 2002/0067565 A1 | 6/2002 | Kelemen | |
| 2003/0174430 A1 * | 9/2003 | Takahashi et al. | 360/75 |
| 2004/0233583 A1 * | 11/2004 | Yanagisawa | 360/294.7 |

OTHER PUBLICATIONS

U.S. Appl. No. 10/211,671, filed Aug. 2, 2002, McKenzie et al.

\* cited by examiner

*Primary Examiner*—Jefferson Evans

(57) ABSTRACT

A disk drive includes a rotatable storage disk, a suspension, and a slider assembly. The slider assembly includes a slider body, a first slider deformer and a second slider deformer. Activation of the first slider deformer deforms the slider body, and activation of the second slider deformer deforms the slider body. Further, the slider deformers can be independently controllable. The read element is positioned near the first slider deformer and the write element is positioned near the second slider deformer. Activation of the first slider deformer adjusts a read head-to-disk spacing of the read element and activation of the second slider deformer adjusts a write head-to-disk spacing of the write element. Further, activation of the first slider deformer does not significantly influence the write head-to-disk spacing and activation of the second slider deformer does not significantly influence the read head-to-disk spacing.

38 Claims, 10 Drawing Sheets

SLIDER WITH INDEPENDENT FLY-HEIGHT ADJUSTMENT OF READER AND WRITER

RELATED APPLICATION

This application claims priority on U.S. Provisional Application Ser. No. 60/587,393 filed on Jul. 13, 2004 and entitled "Thermal Fly-Height Adjust Slider with Two Heaters". The contents of U.S. Provisional Application Ser. No. 60/587,393 are incorporated herein by reference.

BACKGROUND

Disk drives are widely used in computers, consumer electronics and data processing systems for storing information. The disk drive typically includes one or more storage disks and one or more slider assemblies. Each slider assembly includes a read/write head that transfers information to and from the storage disk. Rotation of the storage disk causes the slider assembly to ride on an air bearing with the read/write head spaced apart from the storage disk a distance that is commonly referred to as a "head-to-disk spacing".

Because today's disk drives utilize storage disks having increasingly high densities of data tracks, decreasing the head-to-disk spacing has become of great importance. However, this desire for a very small head-to-disk spacing must be balanced with tribological concerns in order to avoid damage to the read/write head and/or the storage disk, as well as loss of data.

Maintaining a relatively small and consistent head-to-disk spacing is further complicated by other factors. In particular, the read/write head includes a write element. During a write operation, the electrical resistance in the write element generates heat in and around the read/write head. The heat causes thermal expansion of portions of the slider assembly toward the storage disk, known as write pole tip protrusion ("WPTP"). In addition, environmental temperature increases within the disk drive can also result in environmental pole tip protrusion ("EPTP") toward the storage disk. If pole tip protrusion is excessive, the slider assembly can unintentionally contact the storage disk ("head-to-disk contact"), causing off-track writing, degraded data transfer rates, damage to the slider assembly, damage to the storage disk and/or a permanent loss of data.

Conversely, a temperature decrease in the drive will induce the opposite effect on the EPTP—the pole tips will retract from the disk. Such retraction can degrade the performance of the reading and writing process since larger spacing can generally degrade the information transfer to and/or from the disk.

SUMMARY

The present invention is directed to a disk drive that includes a rotatable storage disk, a suspension, and a slider assembly. In one embodiment, the slider assembly includes a slider body, and a mover assembly that includes a first slider deformer and a second slider deformer. In this embodiment, activation of the first slider deformer deforms the slider body, and activation of the second slider deformer deforms the slider body. Further, the slider deformers can be independently activated and controlled.

The read/write head includes (i) a read element such as a magnetoresistive sensor that is positioned near the first slider deformer, and (ii) a write element having a pair of write pole tips that are positioned near the second slider deformer. With this design, activation of the first slider deformer adjusts a read head-to-disk spacing of the read element and activation of the second slider deformer adjusts a write head-to-disk spacing of the write element. Further, in certain designs, activation of the first slider deformer does not significantly influence the write head-to-disk spacing and activation of the second slider deformer does not significantly influence the read head-to-disk spacing.

In one embodiment, activation of the first slider deformer heats the slider body near the read element and creates a first protrusion of the slider body near the read element. Somewhat similarly, activation of the second slider deformer heats the slider body near the write element and creates a second protrusion of the slider body near the write element.

In another embodiment, the slider body includes a first bearing surface and a second bearing surface. In this embodiment, activation of the first slider deformer causes a protrusion of the first bearing surface and activation of the second slider deformer causes a protrusion of the second bearing surface. Further, the read sensor can be positioned near the first bearing surface and the write pole tips can be positioned near the second bearing surface. Moreover, the surface area of one of the bearing surfaces can be greater than the surface area of the other bearing surface.

In yet another embodiment, the mover assembly selectively and independently deforms a first portion of the slider body and a second portion of the slider body. In this embodiment, the mover assembly can independently position and move each of the reader and writer.

The present invention also includes a method for adjusting a head-to-disk spacing in a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
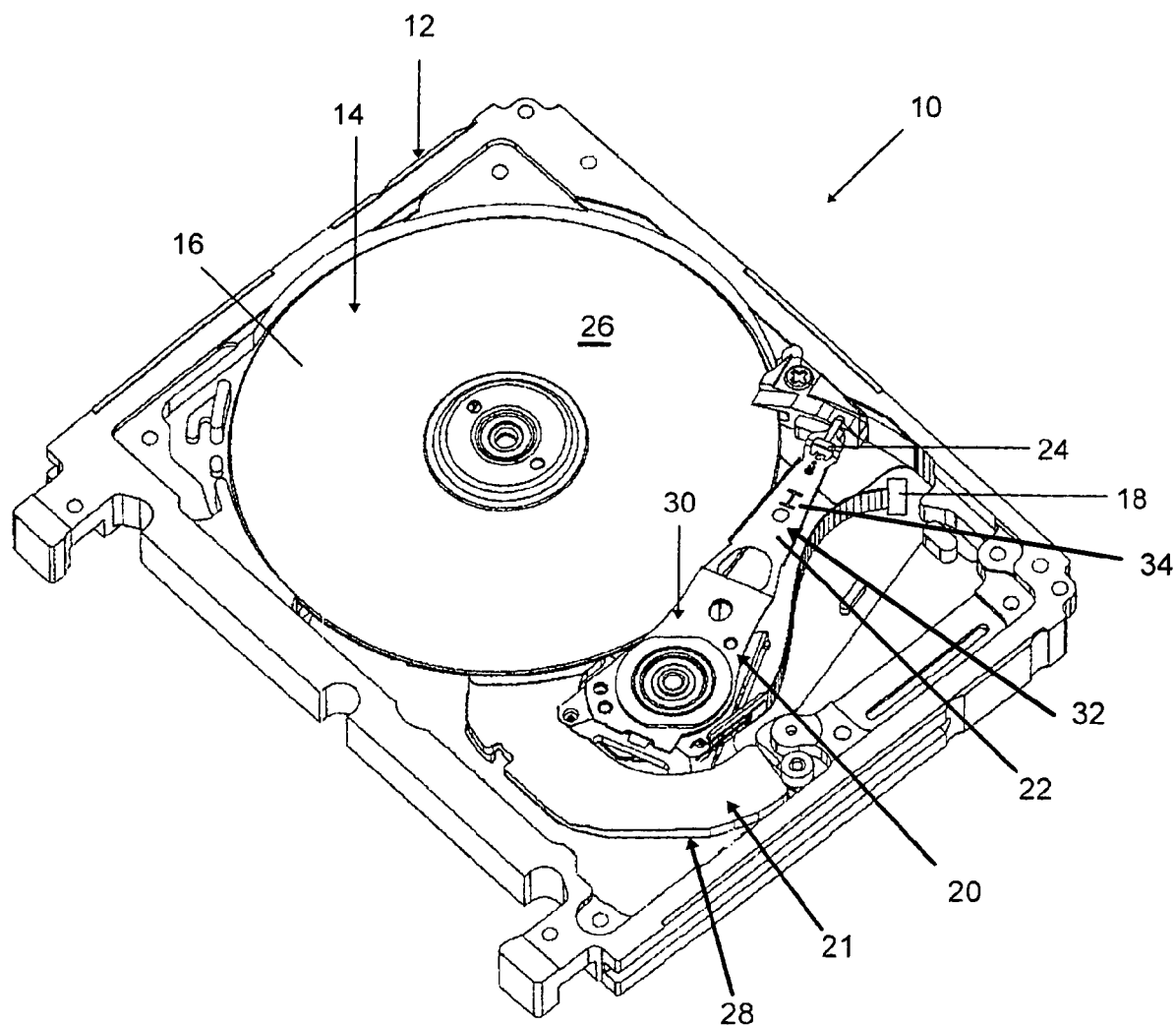
FIG. 1 is a perspective view of a disk drive having features of the present invention.

FIG. 1 illustrates a perspective view of a disk drive 10 that includes (i) a drive housing 12, (ii) a disk assembly 14 having one or more storage disks 16, (iii) a drive circuitry 18, and (iv) a head stack assembly 20 including an actuator assembly 21 and one or more head suspension assemblies 22, with each head suspension assembly 22 including a slider assembly 24.

Each storage disk 16 includes one or more disk surfaces 26 that each has a plurality of concentric data tracks (not shown) that store data, including a target track. Once the slider assembly 24 stabilizes over the target track, data is read from the storage disk 16 during a read operation or date is transferred to the storage disk 16 during a write operation.

The drive circuitry 18 sends and/or receives electrical current from the slider assembly 24 during read and/or write operations of the disk drive 10. Moreover, the drive circuitry 18 can control several additional functions within the disk drive 10. For example, the drive circuitry 18 can direct current to the slider assembly 24 to dynamically adjust and control the spacing between portions of the slider assembly 24 and the storage disk 16. The drive circuitry 18 can include a processor and one or more preamplifiers.

The head stack assembly 20 illustrated in FIG. 1 includes an actuator motor 28, one head suspension assembly 22, and one actuator arm 30. The head suspension assembly 22 is secured to the actuator arm 30, and supports the slider assembly 24 near one of the disk surfaces 26 of the storage disk 16 during operation of the disk drive 10. The actuator motor 28 moves the actuator arm 30 and the head suspension assembly 22 relative to the storage disk 16. The head stack assembly 20 can alternatively include a plurality of actuator arms 30 that each supports up to two head suspension assemblies 22.

The head suspension assembly 22 includes the slider assembly 24, and a suspension 32 that supports the slider assembly. The suspension includes a load beam 34 and a flexure (not shown). The load beam 34 is attached to the actuator arm 30. The load beam 34 is flexible in a direction perpendicular to the storage disk 16 and acts as a spring for supporting the slider assembly 24. The flexure flexibly attaches the slider assembly 24 to the load beam 34 and urges the slider assembly 24 against the load beam 34. The slider assembly 24 transfers information between the drive circuitry 18 and the storage disk 16.

Figure 2A:
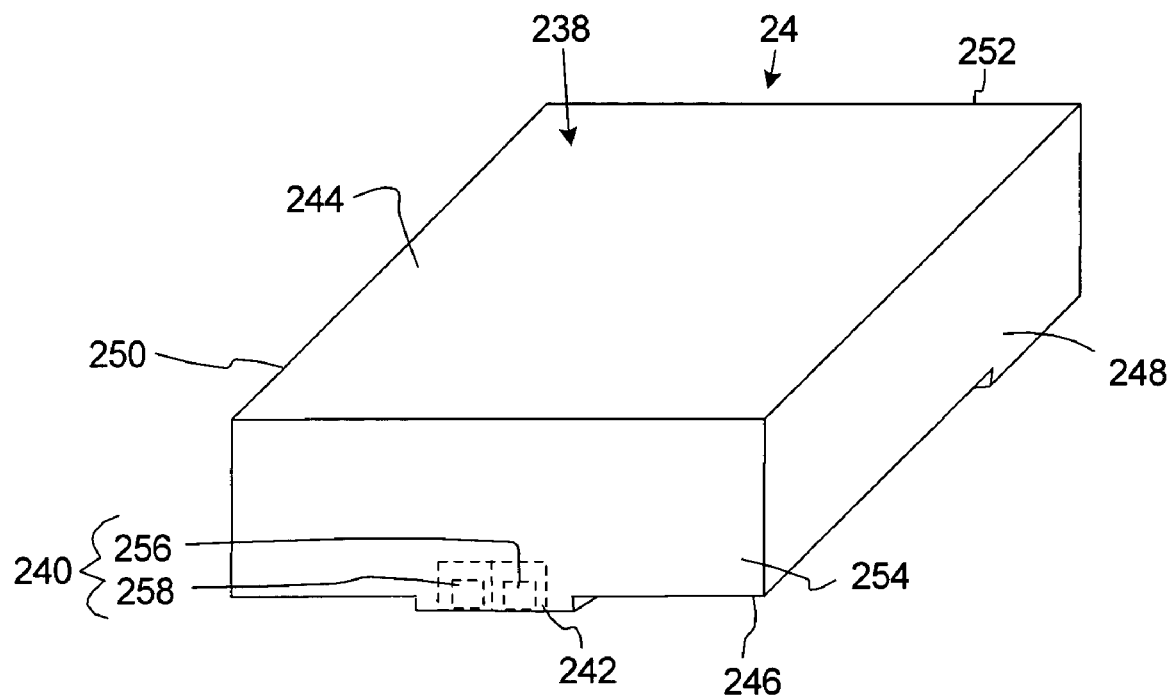
FIG. 2A is a simplified top perspective view of a slider assembly having features of the present invention.

FIG. 2A is a simplified, top perspective view of one embodiment of the slider assembly 24. In this embodiment, the slider assembly 24 includes a slider body 238, a read/write head 240 (illustrated as a box in phantom) that transfers data to or from the storage disk 16 (illustrated in FIG. 1), and a mover assembly 242 (illustrated as a box in phantom) that selectively moves a portion of the slider body 238 and the read/write head 240. The design and configuration of these components can be varied depending upon the requirements of the disk drive 10.

In FIG. 2A, the slider body 238 is generally rectangular shaped and includes a backside 244, an opposed flying side 246 that faces the storage disk 16, an ID side 248 that faces an axis of rotation for the storage disk 16, an OD side 250 that is opposite the ID side 248, a leading edge 252, and a trailing edge 254 that is opposite the leading edge 252. The composition of the slider body 238 can vary. In one embodiment, portions of the slider body 238 can be formed from materials such as alumina titanium carbide ceramic, for example.

In this embodiment, the read/write head 240 and the mover assembly 242 are each positioned within the slider body 238 near the trailing edge 254. Further, the read/write head 240 includes a write element 256 (illustrated as a box) that writes data to the storage disk 16 during a write operation and a read element 258 (illustrated as a box) that reads data from the storage disk 16 during a read operation.

Figure 2B:
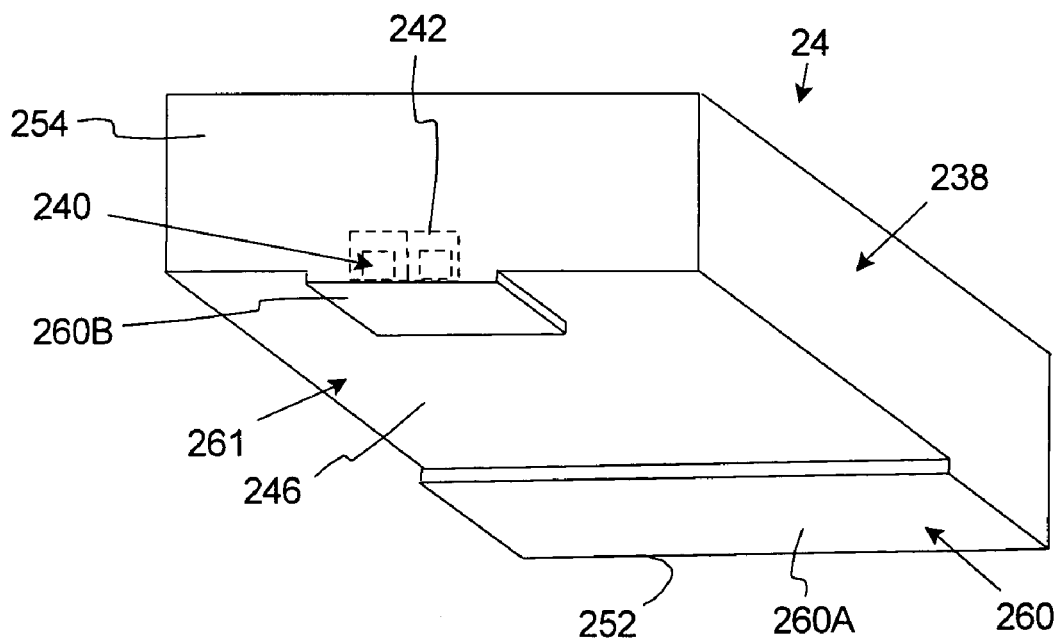
FIG. 2B is a bottom perspective view of the slider assembly of FIG. 2A.

FIG. 2B is a simplified, bottom perspective view of the slider assembly 24. In this embodiment, the flying side 246 includes one or more spaced apart bearing surfaces 260 that provide lift to the slider assembly 24 and a non-bearing surface 261. The non-bearing surface 261 can have two or more depths relative to the bearing surfaces 260 that influence the flying characteristics of the slider assembly 24. Rotation of the storage disk 16 (illustrated in FIG. 1) causes the slider assembly 24 to ride on a fluid supported journal bearing relative to the bearing surfaces 260 so that the read/write head 240 is spaced apart from the storage disk 16.

The number, design, shape, and characteristics of the bearing surfaces 260 can be varied to change the flying characteristics, the landing characteristics, the take-off characteristics, and/or performance of the slider assembly 24. In the embodiment illustrated in FIG. 2B, the slider body 238 includes (i) a leading bearing surface 260A positioned near the leading edge 252, and (ii) a trailing bearing surface 260B positioned near the trailing edge 254. Further, the read/write head 240 is positioned near the trailing bearing surface 260B and the mover assembly 242 is positioned near the read/write head 240.

Alternatively, the slider body 238 can include fewer or more bearing surfaces 260 and the bearing surfaces 260 can be alternatively located and/or shaped.

Figure 3A:
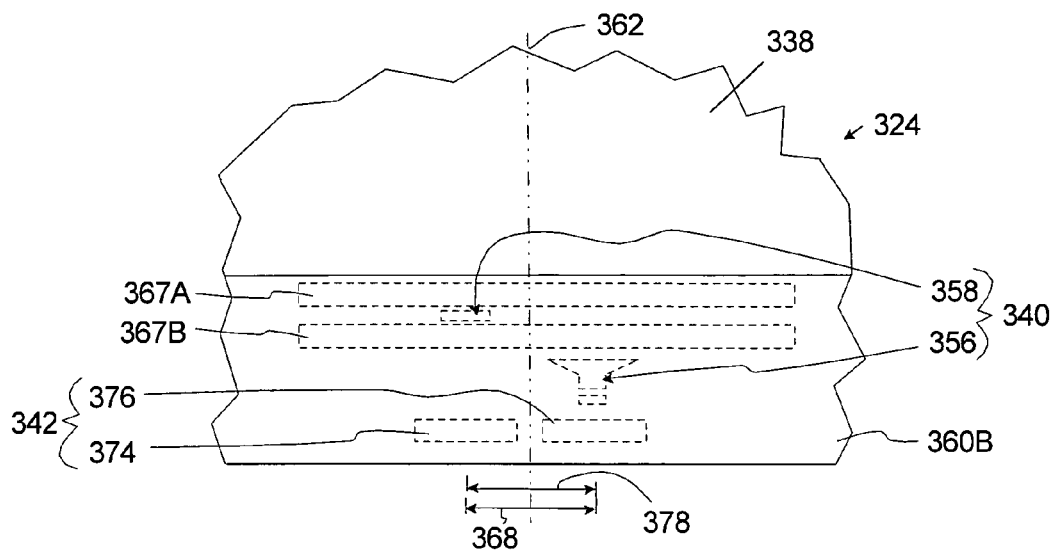
FIG. 3A is an enlarged view of a portion of a flying side of the slider assembly.

FIG. 3A is a simplified, enlarged bottom view of a portion of a slider assembly 324 and illustrates the trailing bearing surface 360B, the read/write head 340 and the mover assembly 342. The slider body 338 has a center axis 362 that extends between the leading edge (not shown in FIG. 3A) and the trailing edge 354.

As provided above, the read/write head 340 includes the write element 356 (illustrated in phantom) that writes data to the storage disk 16 during a write operation and a read element 358 (illustrated in phantom) that reads data from the storage disk 16 (illustrated in FIG. 1) during a read operation. The location of the write element 356, the read element 358, and the mover assembly 342 can be varied to achieve the desired performance of the slider assembly 324. In FIG. 3A, the elements 356, 358 and the mover assembly 342 are positioned near the trailing bearing surface 360B.

In one embodiment, the write element 356 includes a yoke having a leading pole tip and a trailing pole tip, and a write coil. The pole tips form a write gap. During a write operation, electrical current is directed from the drive circuitry 18 (illustrated in FIG. 1) through the write coil. The current in the write coil induces a magnetic flux in the yoke that produces a magnetic field at the write gap. The magnetic field interacts with the storage disk 16 to transfer data to the storage disk 16. It should be noted that current in the write coil also generates heat near the write element 356 that causes a thermal expansion of the slider body 338 and movement of the write element 356 towards the storage disk 16, otherwise known as write pole tip protrusion ("WPTP").

The read element 358 is typically a magnetoresistive sensor. The read element 358 is positioned adjacent to, and between a first shield 367A and a second shield 367B.

In one embodiment, the write element 356 is spaced apart a relatively large distance away from the read element 358. In the embodiment illustrated in FIG. 3A, the center of the write element 356 is laterally offset in the cross track direction, a relatively large separation distance 368 away from the center of the read element 358. As used herein, the phrase "cross track direction" shall mean radial direction with respect to the disk. Further, as used herein, the phrase "down track direction" shall mean circumferential direction with respect to the disk.

In alternative, non-exclusive embodiments, the separation distance 368 is at least approximately 5, 10, 20, 50, 75, 100, 150 or 200 μm. Stated another way, in alternative, non-exclusive embodiments, the separation distance 368 is between approximately 5 and 200 μm, 50 and 100 μm, or 75 and 100 μm. In one embodiment, the separation distance 368 is on the order of approximately one half of the width of the maximum lateral WPTP bulge. In another embodiment, the separation distance 368 is on the order of approximately one half of the width of the maximum lateral bulge created by the WPTP and the mover assembly 342 near the write element 356.

Additionally, in one embodiment, the write element 356 and the read element 358 are positioned on opposite sides of the center axis 362. Alternatively, for example, the write element 356 and the read element 358 can be positioned on the same side of the center axis 362.

As detailed below, in certain embodiments, this relatively large separation distance 368 allows the mover assembly 342 to independently position the write element 356 and the read element 358. Stated another way, the mover assembly 342 can position the write element 356 without significantly influencing the position of the read element 358 and/or the mover assembly 342 can position the read element 358 without significantly influencing the position of the write element 356. As a result thereof, in certain embodiments, the mover assembly 342 can independently adjust a read head-to-disk spacing 370B (illustrated in FIG. 3B) of the read element 358 and can independently adjust a write head-to-disk spacing 372B (illustrated in FIG. 3B) of the write element 356.

Further, high temperatures can degrade the performance of the read element 358 and reduce the operational life of the read element 358. In certain embodiments of the present invention, because of the relatively large separation distance 368, heat generated by the write element 356 and the portion of the mover assembly 342 that moves the write element 356 is less likely to degrade or influence the read element 358. However, for a given arrangement, as the separation distance 368 is increased, keeping track of the micro-jog offset becomes more difficult.

The design of the mover assembly 342 can be varied. In the embodiment illustrated in FIG. 3A, the mover assembly 342 includes a first slider deformer 374 and a second slider deformer 376. In this embodiment, the slider deformers 374, 376 are laterally offset in the cross track direction. Moreover, the first slider deformer 374 is approximately centered along the down track direction over the read element 358 and the second slider deformer 376 is approximately centered along the down track direction over the write element 356.

Additionally, in FIG. 3A, the center of the second slider deformer 376 is spaced apart a deformer distance 378 from the center of the first slider deformer 374. In alternative, non-exclusive embodiments, the deformer distance 378 is at least approximately 5, 10, 20, 50, 75, 100, 150 or 200 μm. Stated another way, in alternative, non-exclusive embodiments, the deformer distance 378 is between approximately 5 and 200 μm, 50 and 100 μm, or 75 and 100 μm. Additionally, in one embodiment, the slider deformers 374, 376 are positioned on opposite sides of the center axis 362. Alternatively, for example, the slider deformers 374, 376 can be positioned on the same side of the center axis 362.

Moreover, in this embodiment, each of slider deformers 374, 376 is electrically connected to the drive circuitry 18 (illustrated in FIG. 1) and the drive circuitry 18 can independently direct current to each of the slider deformers 374, 376. With this design, the slider deformers 374, 376 can be individually and independently controlled.

The design of each of the slider deformers 374, 376 can be varied. In one embodiment, each slider deformers 374, 376 cause a separate deformation in the slider body 338. In this embodiment, each slider deformers 374, 376 can include an electrical conductor such as a coil that is electrically connected to the drive circuitry 18 (illustrated in FIG. 1) so that the drive circuitry 18 can activate and control each of the slider deformers 374, 376. With this design, current through the electrical conductor generates heat that is transferred to the area surrounding the respective slider deformer 374, 376. The heat causes a thermal deformation of the slider body 338 near the respective slider deformer 374, 376. The thermal deformation results in a protrusion near the respective slider deformer 374, 376 towards the storage disk 16. With this design, the protrusion caused by the first slider deformer 374 moves the read element 358 towards the storage disk 16 and reduces the read head-to-disk spacing 370B. Further, the protrusion caused by the second slider deformer 376 moves the write element 356 towards the storage disk 16 and reduces the write head-to-disk spacing 372B.

In one embodiment, each slider deformer 374, 376 is formed from a material having a relatively high electrical resistivity. The size, shape, composition, and/or geometry of each slider deformer 374, 376 can be designed to suit the performance characteristics of the drive 10. Each slider deformer 374, 376 can be sized and shaped to provide sufficiently rapid heating.

In one embodiment, the first slider deformer 374 can have different characteristics than the second slider deformer 376. For example, the first slider deformer 374 can be larger or smaller than the second slider deformer 376. Alternatively, the first slider assembly 374 can have a higher or lower resistance or conductivity than the second slider deformer 376.

Further, in FIG. 3A, the slider deformers 374, 376 are embedded and incorporated substantially entirely within the slider body 338 and each of the slider deformers 374, 376 is positioned near the trailing edge 354. Alternatively, one or both of the slider deformers 374, 376 can be positioned in other locations in the slider body 238 and/or partly or entirely positioned outside the slider body 338. Further, the slider deformers 374, 376 do not need to be at the same depth, layer or relative location in the slider body 338.

In one embodiment, each slider deformer 374, 376 is not in direct electrical communication with the write element 356 and the read element 358. Stated another way, the slider deformers 374, 376 are electrically isolated from the write element 356 and the read element 358, nor is there any significant electrical coupling there between.

In another embodiment, each slider deformer 374, 376 can be another type of device that adjusts the surface profile of the slider body 338, creates a protrusion on the slider body 338 and/or moves the element 356, 358. For example, one or both of slider deformers 374, 376 can include a piezoelectric element or a diode that alters the shape of the slider body 338. Still alternatively, the mover assembly 342 can include any device that causes a controlled and independent relative movement between the write element 356 and the read element 358.

Figure 3B:
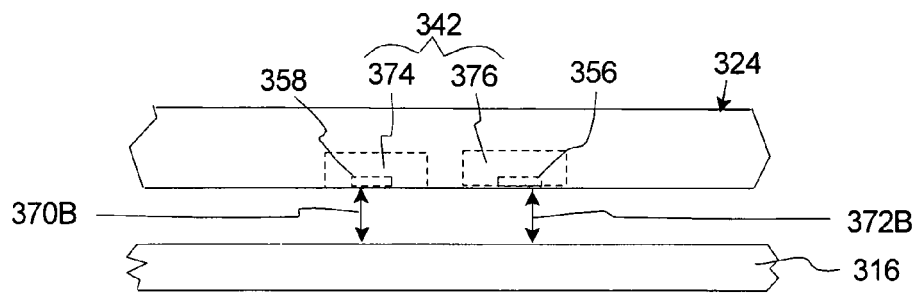
FIG. 3B is a simplified end view of a portion of the storage disk, and a portion of the slider assembly of FIG. 3A in an initial position.

FIG. 3B is a simplified end view of a portion of the storage disk 316, and a portion of the slider assembly 324 in an initial position. More specifically, FIG. 3B illustrates the relationship between (i) an initial read head-to-disk spacing 370B of the read element 358 without the drive circuitry 18 (illustrated in FIG. 1) directing current to the first slider deformer 374, and (ii) an initial write head-to-disk spacing 372B of the write element 356 without the drive circuitry 18 directing current to the second slider deformer 376. At this time, the read head-to-disk spacing 370B is approximately equal to the write head-to-disk spacing 372B. In the initial position, the head-to-disk spacings 370B, 372B can be relative large. As a non-exclusive example, at this position, the head-to-disk spacings 370B, 372B can be between approximately 3 and 30 nanometers. Further, because the head-to-disk spacings 370B, 372B are relatively large, the likelihood of head-to-disk contact is reduced.

It should be noted that in certain embodiments, the mover assembly 342 can not increase the head-to-disk spacings 370B, 372B from the initial position. Accordingly, in these embodiments, the disk drive 10 should be designed so that the initial head-to-disk spacings 370B, 372B are slightly larger to provide a range of actuation for the mover assembly 342 to adjust the head-to-disk spacings 370B, 372B.

Figure 3C:
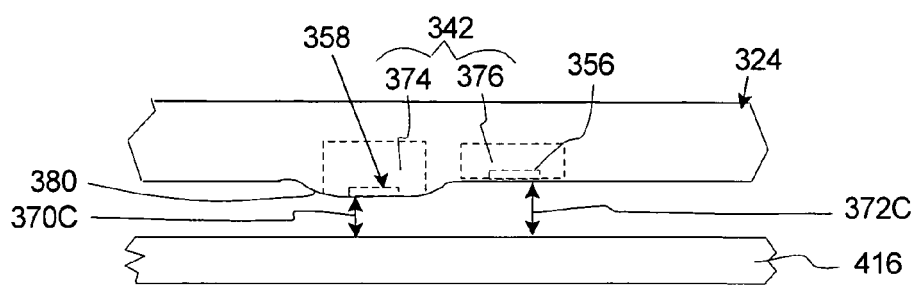
FIG. 3C is a simplified end view of a portion of the storage disk, and a portion of the slider assembly of FIG. 3A in a read position.

FIG. 3C is a simplified end view of a portion of the storage disk 316, and a portion of the slider assembly 324 in a read position with the read element 358 reading data from the storage disk 316. More specifically, FIG. 3C illustrates the relationship between (i) the read head-to-disk spacing 370C with the drive circuitry 18 directing current to the first slider deformer 374, and (ii) the write head-to-disk spacing 372C without the drive circuitry 18 directing current to the second slider deformer 376. At this time, the first slider deformer 374 has moved the read element 358 relative to the write element 356 and the storage disk 316 so that the read head-to-disk spacing 370C is less than write head-to-disk spacing 372C. In this position, the read head-to-disk spacing 370C can be relative small and the write head-to-disk spacing 372C can be relatively large.

In alternative non-exclusive, embodiments, the first slider deformer 374 has moved the read element 358 relative to the write element 356 and the storage disk 316 at least approximately 0.1, 0.2, 0.4, 0.5, 1, 2, 3, 4, 5, 6, 7, 8, 9, 10, 20 or 30 nanometers. Stated in yet another way, the first slider deformer 374 can adjust and change the read head-to-disk spacing 370C any distance within the range of approximately 0.1 and 2 nanometers, approximately 0.1 and 5 nanometers, or approximately 0.1 and 25 nanometers. In one embodiment, the read head-to-disk spacing 370C is reduced to be as close to zero nanometers as possible without contacting the storage disk 16.

In certain embodiments, the first slider deformer 374 creates a first protrusion 380 and moves the read element 358 without significantly moving the write element 356. Stated another way, the first slider deformer 374 reduces the read head-to-disk spacing 370C without significantly influencing the write head-to-disk spacing 372C. For example, in alternative, non-exclusive example, activation of the first slider deformer 374 causes at least approximately 1.5, 2, 5, 10, 20, 40, 60, 80, 100 times more reduction in the read head-to-disk spacing 370C than in the write head-to-disk spacing 372C.

It should be noted that the first slider deformer 376 can be used to control the read head-to-disk spacing 370C any time during the operation of the drive 10, including prior to a read command, immediately following initiation of a read command, during reading of the data, and/or after data reading is complete.

Generally speaking, for a given slider assembly 324 arrangement, as the heat generated by the first slider deformer 374 is increased, the size of the first protrusion 380 is increased. The precise relationship between amount of current to the first slider deformer 374 and the resulting change in read head-to-disk spacing 370C will depend upon many factors, including the design of the first slider deformer 374 and the slider body 338.

Figure 3D:
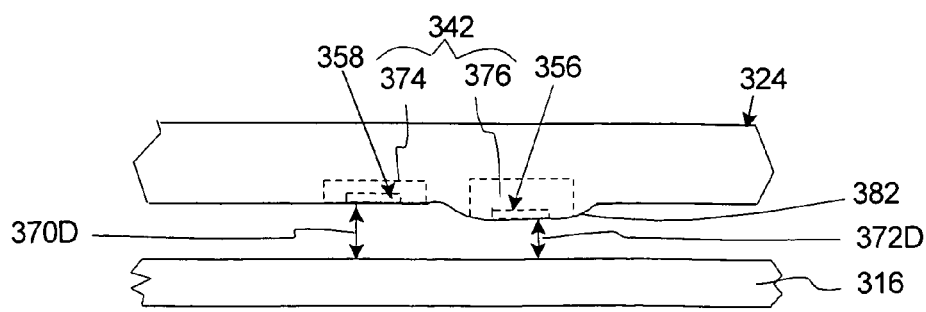
FIG. 3D is a simplified end view of a portion of the storage disk, and a portion of the slider assembly in a write position.

FIG. 3D is a simplified end view of a portion of the storage disk 316, and a portion of the slider assembly 324 in a read position and the write element 356 is writing data to the storage disk 316. More specifically, FIG. 3D illustrates the relationship between (i) the read head-to-disk spacing 370D without the drive circuitry 18 directing current to the first slider deformer 374, and (ii) the write head-to-disk spacing 372D with the drive circuitry 18 directing current to the second slider deformer 376. At this time, the second slider deformer 376 has moved the write element 356 relative to the read element 358 and the storage disk 316 so that the write head-to-disk spacing 372D is less than the read head-to-disk spacing 370C. In this position, the write head-to-disk spacing 372D can be relative small and the read head-to-disk spacing 370D can be relatively large.

In alternative non-exclusive, embodiments, the second slider deformer 376 has moved the write element 356 relative to the read element 358 and the storage disk 316 at least approximately 0.1, 0.2, 0.4, 0.5, 1, 2, 3, 4, 5, 6, 7, 8, 9, 10, 20 or 30 nanometers. Stated in yet another way, the second slider deformer 376 can adjust and change the write head-to-disk spacing 372D any distance within the range of approximately 0.1 and 2 nanometers, approximately 0.1 and 5 nanometers, or approximately 0.1 and 25 nanometers. In one embodiment, the write head-to-disk spacing 372D can be reduced to be as close to zero nanometers as possible without contacting the storage disk 16.

It should be noted that position of the write element 356 illustrated in FIG. 3D is result of the movement caused by the second slider deformer 376 and the WPTP caused by energizing the write coil.

In certain embodiments, the second slider deformer 376 creates a second protrusion 382 that is spaced apart from the first protrusion 380 (illustrated in FIG. 3C) and moves the write element 456 without significantly moving the read element 358. Stated another way, the second slider deformer 376 reduces the write head-to-disk spacing 372D without significantly influencing the read head-to-disk spacing 370D. For example, in alternative, non-exclusive example, activation of the second slider deformer 376 causes at least approximately 1.5, 2, 5, 10, 20, 40, 60, 80, 100 times more reduction in the write head-to-disk spacing 372D than in the read head-to-disk spacing 370D.

It should be noted that the second slider deformer 376 can be used to control the write head-to-disk spacing 372D any time during the operation of the drive 10, including prior to a write command, immediately following initiation of a write command, during writing of the data, and/or after data writing is complete.

Generally speaking, for a given slider assembly 324 arrangement, as the heat generated by the second slider deformer 376 is increased, the size of the second protrusion 382 is increased. The precise relationship between amount of current to the second slider deformer 376 and the resulting change in write head-to-disk spacing 372D will depend upon many factors, including the design of the second slider deformer 376 and the slider body 338.

With the present design, because the read head-to-disk spacing 370D can be maintained relatively large during a write operation, the chances of the read element 358 contacting the disk 316 at this time are reduced. This reduces the probability and extent of read element 358 degradation during write operations or burnishing operations. This also improves the reliability of the read element 358.

Moreover, if future drives 10 are designed for continuous or intermittent contact between the write element 356 and the disk 316 during a write operation, with the present invention, the read element 358 can be maintained away from the storage disk 316.

Comparing FIGS. 3C and 3D, with certain designs, the control of read head-to-disk spacing 370C, 370D is effectively decoupled from the control of the write head-to-disk spacing 372C, 372D. Stated another way, the read head-to-disk spacing 370C, 370D and the write head-to-disk spacing 372C, 372D can be precisely and independently controlled.

In certain embodiments, the present invention allows a programmable spacing delta or standoff between read element 358 and the write element 356. For example, the read head-to-disk spacing 370C, 370D and the write head-to-disk spacing 372C, 372D can be adjusted for the different modes of the drive 10, including read mode, write mode pre-write mode, or idle mode.

The ability to precisely control the head-to-disk spacings is an important factor that will allow for increased the aerial density of the storage disk. In certain embodiments, for the same aerial density, a larger magnetic spacing range can be tolerated during a read operation than during a write operation. With the present invention, the read element 358 and the write element 356 can be precisely positioned to achieve the desired performance.

Figure 4A:
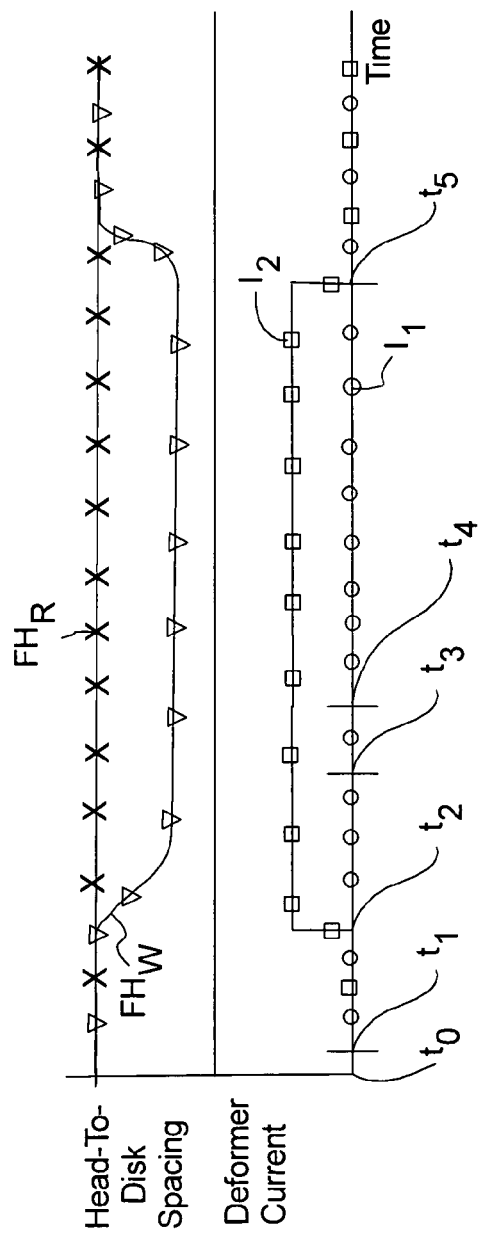
FIG. 4A is a graph that illustrates the relationship between time, current, and head-to-disk spacing during a write operation.

FIG. 4A is a graph that illustrates one embodiment of the relationship between current to the first slider deformer, current to the second slider deformer, the read head-to-disk spacing, and the write head-to-disk spacing during a write operation. In FIG. 4A, line $I_1$ represents the current being directed to the first slider deformer, line $I_2$ represents the current being directed to the second slider deformer, line $FH_R$ represents the read head-to-disk spacing, and line $FH_W$ represents the write head-to-disk spacing.

At time $t_0$, no current $I_1$, $I_2$ is directed the slider deformers, the read head-to-disk spacing $FH_R$, and the write head-to-disk spacing $FH_W$ are at the initial position. At time $t_1$, a write operation is initiated. At time $t_2$, the disk drive commences a seek mode. The seek mode continues until time $t_3$ when the disk drive begins the settle mode. The settle mode continues until 4 when the disk drive begins the track following mode. During the seek and/or settle mode, e.g. time $t_2$-$t_4$, the drive circuitry begins directing current $I_2$ to the second slider deformer. As a result thereof, during $t_2$-$t_4$, the temperature of the slider assembly near the write element increases without writing data to storage disk and the write head-to-disk spacing decreases. Stated another way, once the disk drive switches to track following mode at time $t_4$, the disk drive is ready to begin writing data. At this time, the drive circuitry directs current to the write element in the write mode, and writing commences. As a result of the heat generated by current in the write element, the current $I_2$ directed to the second slider deformer can be decreased while maintaining the write head-to-disk spacing at the desired distance. At time $t_5$, the drive circuitry ceases directing current to the write element and the second slider deformer. As a result thereof, the write head-to-disk spacing increases back to the initial write head-to-disk spacing after $t_5$.

It should be noted that during the entire write operation, no current is directed to the first slider deformer and the read head-to-disk spacing is not substantially changed.

Figure 4B:
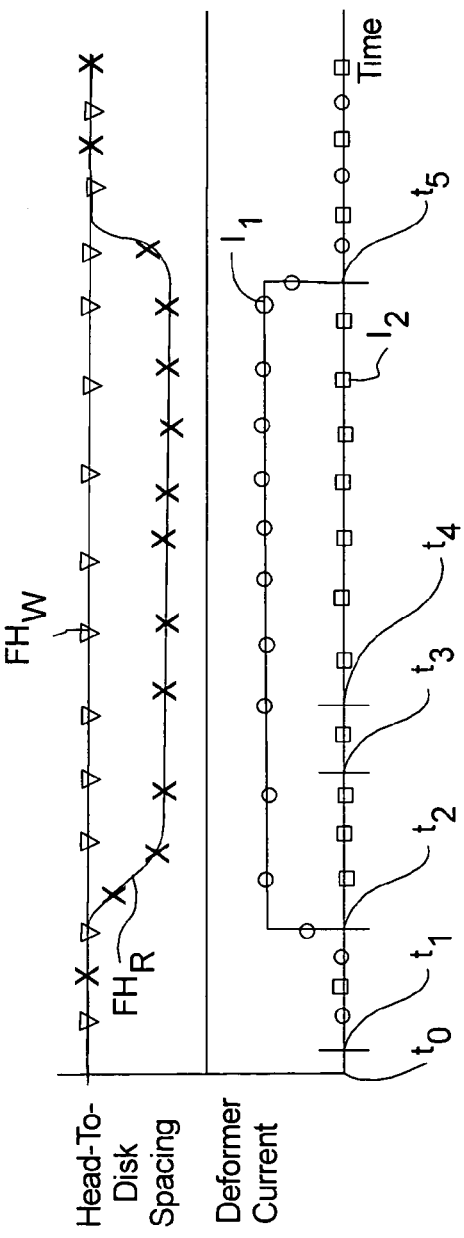
FIG. 4B is a graph that illustrates the relationship between time, current, and head-to-disk spacing during a read operation.

FIG. 4B is a graph that illustrates one embodiment of the relationship between current to the first slider deformer, current to the second slider deformer, the read head-to-disk spacing, and the write head-to-disk spacing during a read operation. In FIG. 4G, line $I_1$ represents the current being directed to the first slider deformer, line $I_2$ represents the current being directed to the second slider deformer, line $FH_R$ represents the read head-to-disk spacing, and line $FH_W$ represents the write head-to-disk spacing.

At time to, no current $I_1$, $I_2$ is directed the slider deformers, the read head-to-disk spacing $FH_R$, and the write head-to-disk spacing $FH_W$ are at the initial position. At time $t_1$, a read operation is initiated. At time $t_2$, the disk drive commences a seek mode. The seek mode continues until time $t_3$ when the disk drive begins the settle mode. The settle mode continues until $t_4$ when the disk drive begins the track following mode. During the seek and/or settle mode, e.g. time $t_2$-$t_4$, the drive circuitry begins directing current $I_1$ to the first slider deformer. As a result thereof, during $t_2$-$t_4$, the temperature of the slider assembly near the read element increases without writing data to storage disk and the read head-to-disk spacing decreases. Stated another way, once the disk drive switches to track following mode at time $t_4$, the disk drive is ready to begin reading data. At this time, reading commences. At time $t_5$, the drive circuitry ceases directing current to the first slider deformer. As a result thereof, the read head-to-disk spacing increases back to the initial read head-to-disk spacing after $t_5$.

It should be noted that during the entire read operation, the write head-to-disk spacing is not substantially changed.

It should also be noted that depending upon the operation or the design of the drive, the drive circuitry can be directing current to both slider deformers at the same time. In this design, the level of current to each slider deformer can be the same or different.

Figure 5:
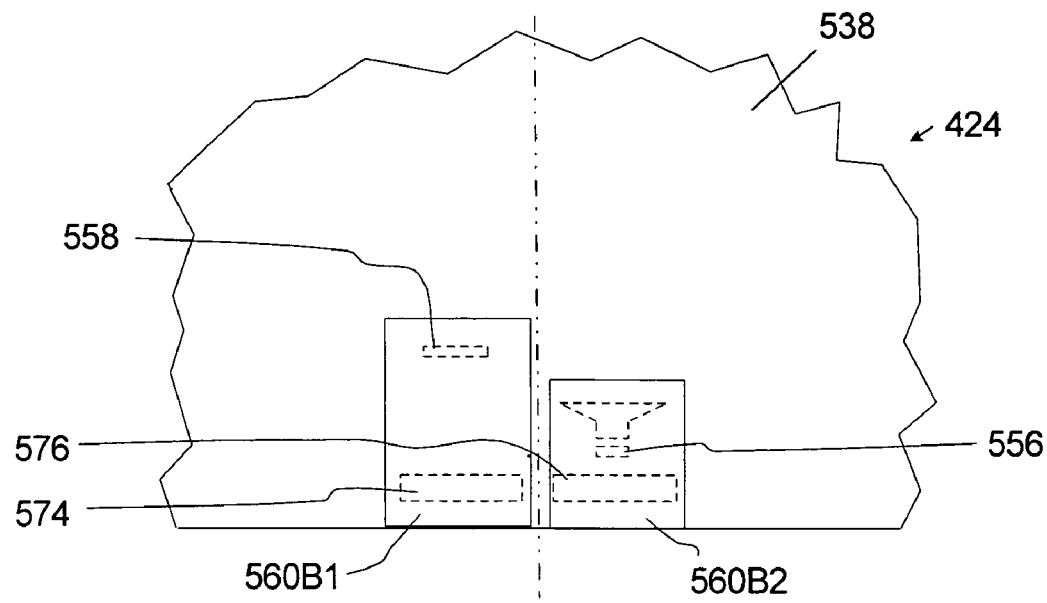
FIG. 5 is an enlarged view of a portion of another embodiment of a slider assembly.

FIG. 5 is a bottom view of a portion of another embodiment of a slider assembly 524 that is somewhat similar to the slider assembly 424 described above. However, in this embodiment, the slider body 538 includes a first trailing bearing surface 560B1 and a laterally spaced apart second trailing bearing surface 560B2. Further, the read element 558 and the first slider deformer 574 are positioned on the first trailing bearing surface 560B1 and the write element 556 and the second slider deformer 576 are positioned on the second trailing bearing surface. In certain embodiments, (i) the first slider deformer 574 deforms the first trailing bearing surface 560B1 without deforming the second trailing bearing surface 560B2, and (ii) the second slider deformer 576 deforms the second trailing bearing surface 560B2 without deforming the first trailing bearing surface 560B1.

In one embodiment, (i) one of the trailing bearing surfaces 560B1, 560B2 has a larger surface area than the other trailing bearing surface 560B2, 560B1, and/or (ii) one of the trailing bearing surfaces 560B1, 560B2 produces more lift than the other trailing bearing surface 560B2, 560B1. In alternative, non-exclusive embodiments, the difference in surface area is at least approximately 10, 20, 50, 75, 90, or 99 percent. Further, in alternative, non-exclusive embodiments, the difference in lift is at least approximately 10, 20, 50, 75, 90, or 99 percent.

In certain designs, the deformation of the trailing bearing surfaces 560B1, 560B2 increases the lift forces that are generated by the particular trailing bearing surfaces 560B1, 560B2. Generally speaking, if the area of the trailing bearing surface is large, the increase in lift force due to protrusion is large. And if the area of the trailing bearing surface is small, the increase in lift force due to protrusion is small. With this in mind, the read element 558 and/or the write element 556 can be positioned on relatively small bearing surfaces to achieve the desired flying characteristics of the slider assembly 524. If the first trailing bearing surface 560B1 is relatively small, activation of the first slider deformer 574 will not significantly influence the lift generated by the first trailing bearing surface 560B1. Similarly, if the second trailing bearing surface 560B2 is relatively small, activation of the second slider deformer 576 will not significantly influence the lift generated by the second trailing bearing surface 560B2.

Figure 6A:
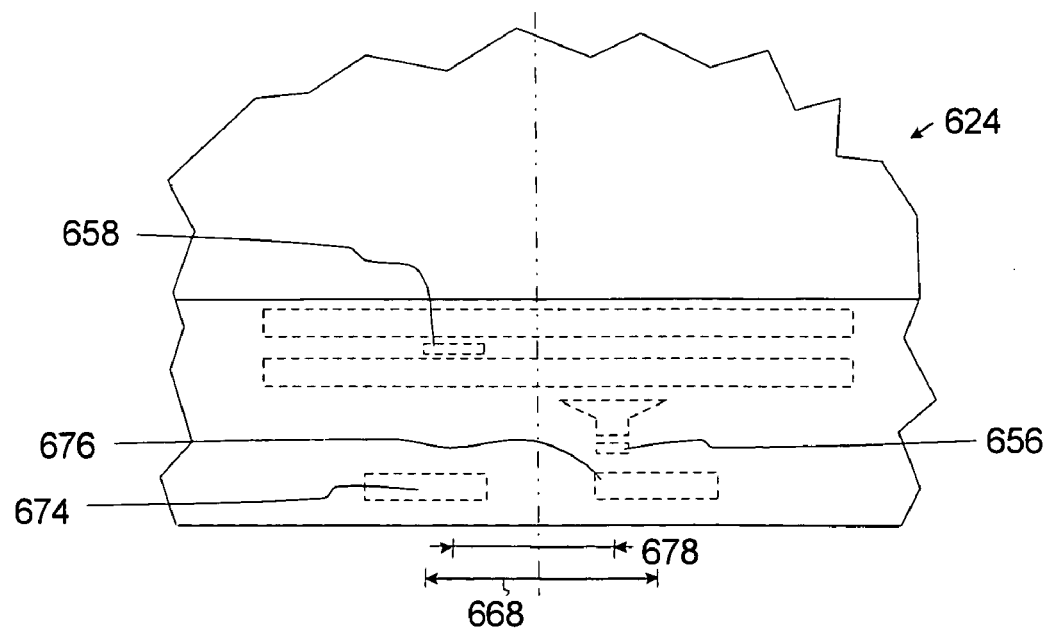
FIG. 6A is an enlarged view of a portion of yet another embodiment of a slider assembly.

FIG. 6A is a bottom view of a portion of yet another embodiment of a slider assembly 624 that is somewhat similar to the slider assembly 424 described above. However, in this embodiment, the deformer distance 678 is greater than in the previous embodiment. For example, the deformer distance 678 can be greater than the separation distance 668. In this embodiment, the slider deformers 674, 676 are laterally offset in the cross track direction such that the center of each deformer lies out board to its respective element.

Figure 6B:
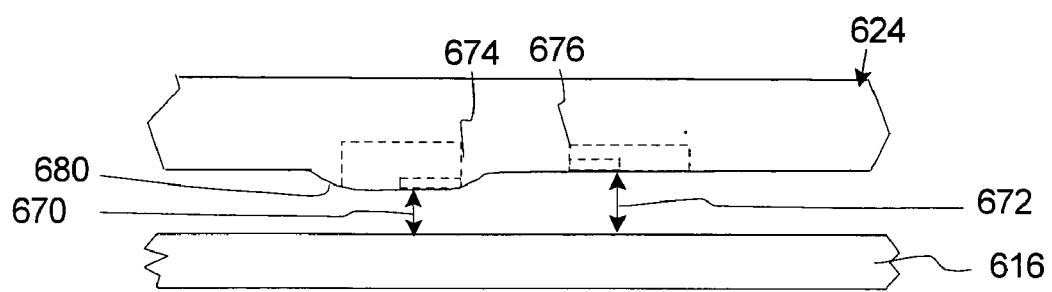
FIG. 6B is a simplified end view of a portion of the storage disk, and a portion of the slider assembly of FIG. 6A in a read position.
Figure 6C:
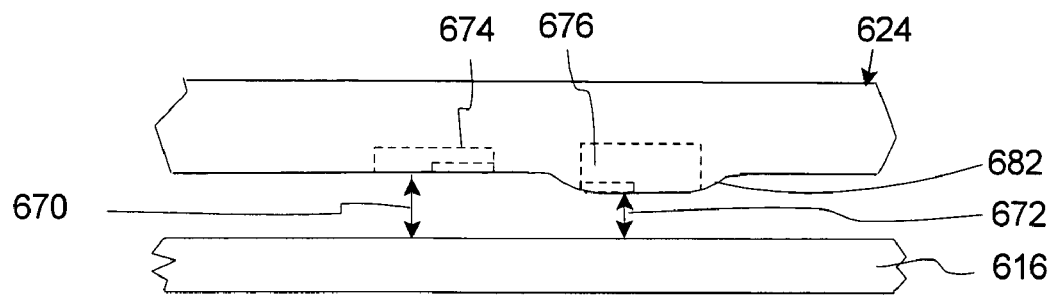
FIG. 6C is a simplified end view of a portion of a storage disk, and a portion of the slider assembly of FIG. 6A in a write position.

FIG. 6B is a simplified end view of a portion of the storage disk 616, and the portion of the slider assembly 624 of FIG. 6A in a read position and FIG. 6C is a simplified end view of a portion of the storage disk 616, and a portion of the slider assembly 624 of FIG. 6A in a write position. Because of the greater deformer distance 678, the first protrusion 680 created by the first slider deformer 674 has less of an influence on the write head-to-disk spacing 672 than the previous design and the second protrusion 682 created by the second slider deformer 676 has less of an influence on the read head-to-disk spacing 670 than the previous design.

Figure 7:
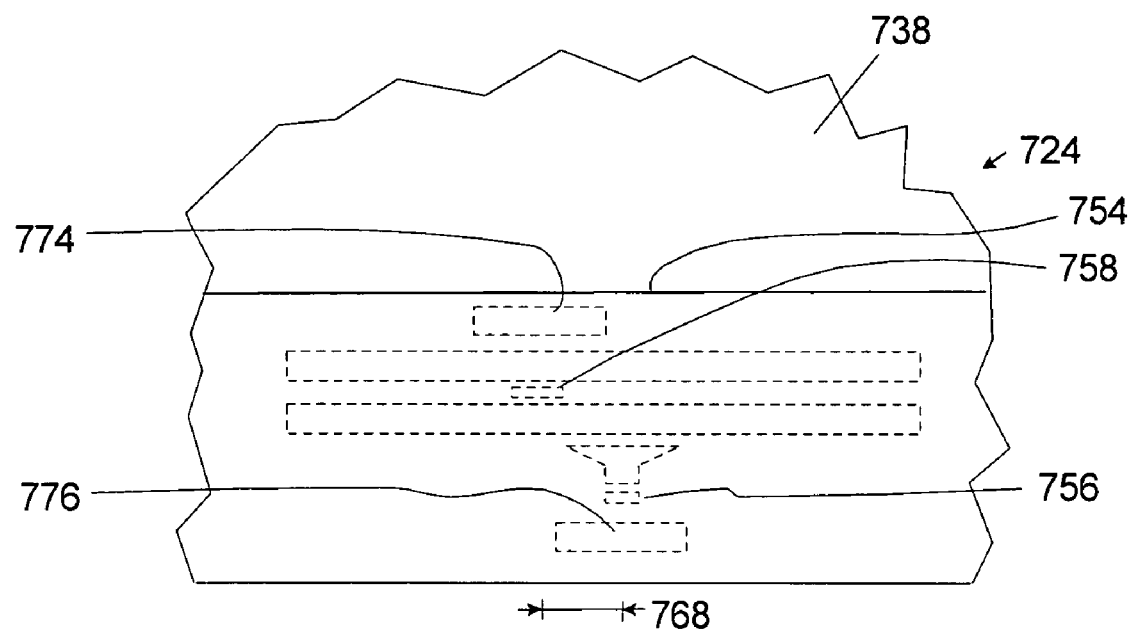
FIG. 7 is an enlarged view of a portion of still another embodiment of a slider assembly.

FIG. 7 is a bottom view of a portion of yet another embodiment of a slider assembly 724 that is somewhat similar to the slider assembly 424 described above. However, in this embodiment, the slider deformers 774, 776 and the elements 756, 758 are substantially aligned in the down track direction. Further, (i) the slider deformers 774, 776 are spaced apart in the down track direction and (ii) the elements 756, 758 are displaced in the down track direction and a relatively small separation distance 768 in the cross track direction. Moreover, in this embodiment, the first slider deformer 774 is positioned before the read element 758 in the down track direction, and the second slider deformer 776 is positioned after writer element 756 in the down track direction. Stated another way, the elements 756, 758 are positioned between the slider deformers 774, 776.

In this embodiment, the drive circuitry 18 (illustrated in FIG. 1) can control the slider deformers 774, 776 to control the positions of the elements 756, 758. Further, in this embodiment, the slider deformers 774, 776 can be controlled so that the trailing edge 754 of the slider body 738 is the closest to the storage disk 16. With careful design, the protruded trailing edge can inhibit contact between the read element 758 and the storage disk 16.

Figure 8:
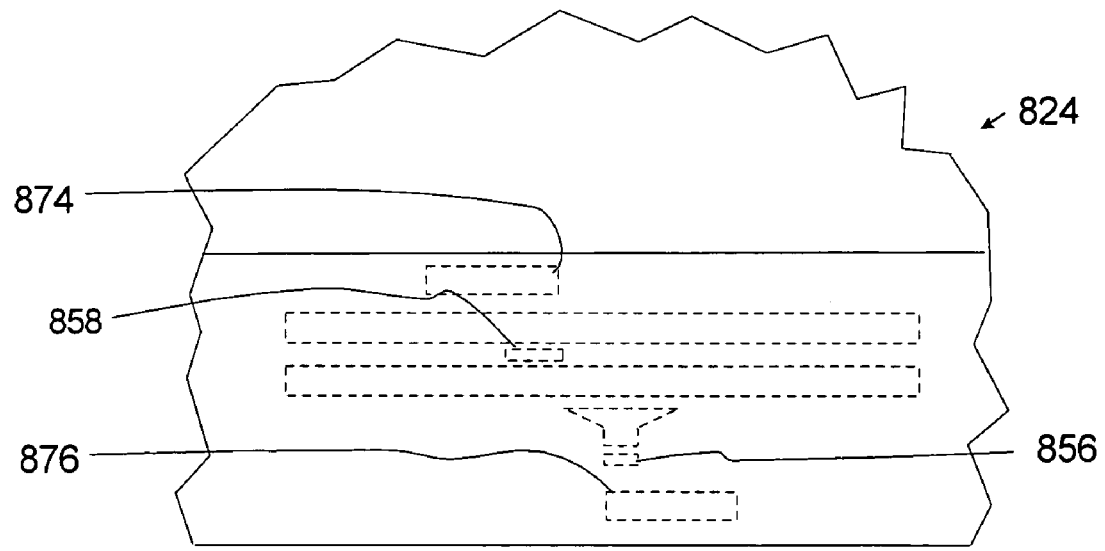
FIG. 8 is an enlarged view of a portion of yet another embodiment of a slider assembly.

FIG. 8 is a bottom view of a portion of yet another embodiment of a slider assembly 824 that is somewhat similar to the slider assembly 724 illustrated in FIG. 7. However, in this embodiment, the slider deformers 874, 876 are offset in the cross track direction. In this embodiment, the drive circuitry 18 (illustrated in FIG. 1) can control the slider deformers 874, 876 to control the positions of the read element 858 and the write element 856.

Figure 9A:
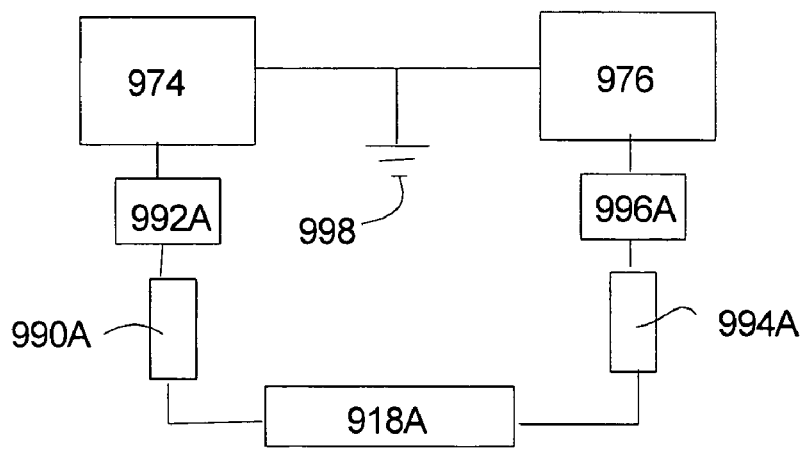
FIG. 9A illustrates a first circuit having features of the present invention.
Figure 9B:
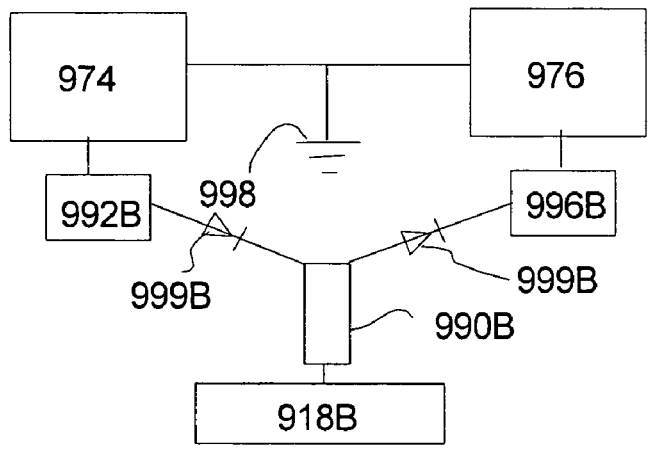
FIG. 9B illustrates a second circuit having features of the present invention.
Figure 9C:
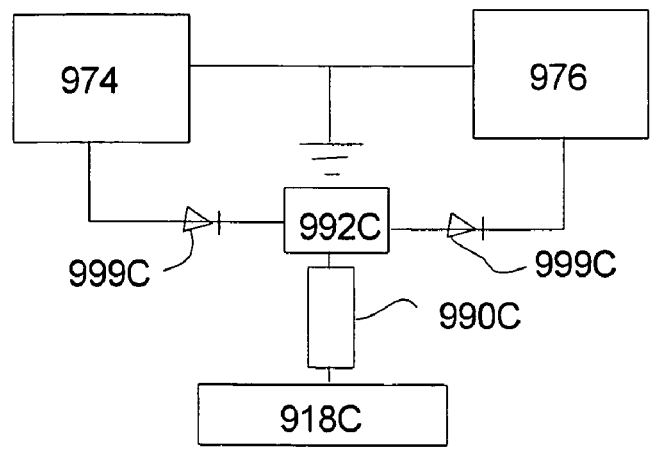
FIG. 9C illustrates a third circuit having features of the present invention.

FIGS. 9A-9C each illustrate alternative embodiments of a circuit that can be used in one or more of the embodiments discussed above. The circuits illustrated in FIGS. 9A-9C can direct current to the first slider deformer 974 and second slider deformer 976 individually and simultaneously.

In FIG. 9A, the drive circuitry 918A independently directs current to each slider deformer 974, 976. In this embodiment, the drive circuitry 918A can include a preamp or PCBA. The drive circuitry 918A is electrically connected to (i) the first slider deformer 974 via a first suspension trace 990A and a first connection pad 992A and (ii) the second slider deformer 974 via a second suspension trace 994A and a second connection pad 996A. Further, each slider deformer 974, 976 is electrically connected to a common slider ground 998. With this design voltage of either polarity can be used to drive the slider deformers 974, 976.

In FIG. 9B, the drive circuitry 918B independently directs current to each slider deformer 974, 976. In this embodiment, the drive circuitry 918B can include a preamp or PCBA. The drive circuitry 918B is electrically connected to (i) the first slider deformer 974 via a common suspension trace 990B and a first connection pad 992B and (ii) the second slider deformer 974 via the common suspension trace 994B and a second connection pad 996B. Further, each slider deformer 974, 976 is electrically connected to the common slider ground 998.

Additionally, in this embodiment, the circuit includes one or more diodes 999B that are inserted so that voltage of one polarity drives the first slider deformer 974 and voltage of the opposite polarity drives the second slider deformer 976. The two slider deformers 974, 976 can be driven simultaneously using Pulse Width Modulation with different plus and minus voltages. In FIG. 9B, the diodes 999B are inserted just before the connection pads 992B, 996B. Accordingly, only one suspension trace 990B is necessary. Alternatively, if the diodes are located in the drive circuitry 918B at the preamp or PCBA end, two suspension traces are needed.

FIG. 9C illustrates a circuit that is variation of circuit illustrated in FIG. 9B. In particular, in this embodiment, the diodes 999C have been integrated into the slider assembly. This allows the use of only one suspension trace 990C and one connection pad 992C to drive the two slider deformers 974, 976 simultaneously.

Figure 10A:
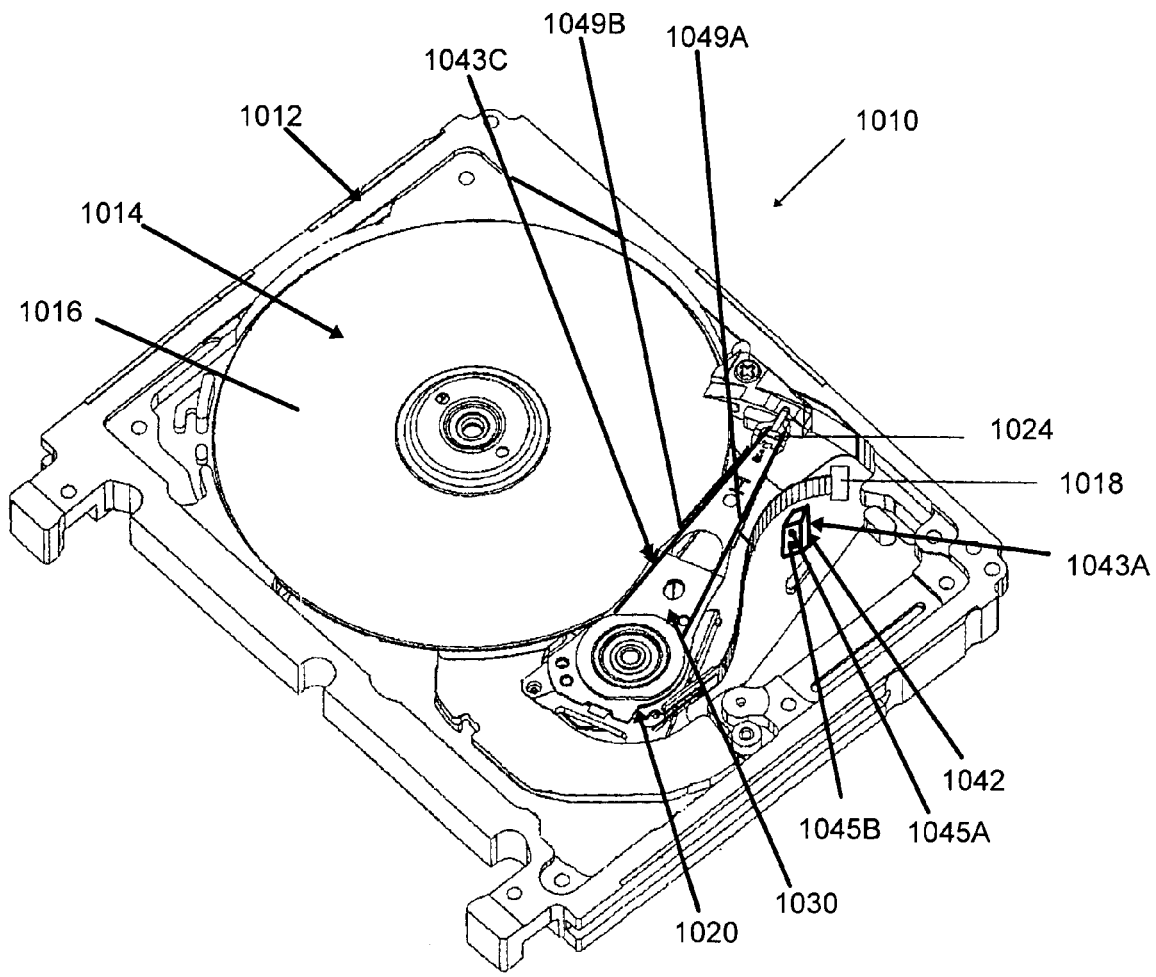
FIG. 10A is a perspective view of another embodiment of a disk drive having features of the present invention.

FIG. 10A illustrates yet another embodiment of a disk drive 1010 having features of the present invention. In this embodiment, the drive housing 1012, the disk assembly 1014, the drive circuitry 1018, and the head stack assembly 1020 are somewhat similar to the corresponding components described above. However, in this embodiment, the mover assembly 1042 is different.

In this embodiment, the mover assembly 1042 is still adapted to make adjustments to the position of the read element 258 (illustrated in FIG. 2A) and/or the write element 256 (illustrated in FIG. 2A) relative to the storage disk 1016. In one embodiment, the mover assembly 1042 includes an energy source 1043A that generates an energy beam 1043B (illustrated in FIG. 10B), and a beam director 1043C that directs the energy beam 1043B at the appropriate location on the slider assembly 1024. The energy beam 1043B on the slider body 338 heats the appropriate location of the slider assembly 1024 and causes a controlled protrusion of the slider assembly 1024 in the desired location. In one embodiment, the energy source 1043A includes a first laser diode 1045A that generates a first laser beam 1047A (illustrated in FIG. 10B) and a second laser diode 1045B that generates a second laser beam 1047B (illustrated in FIG. 10B). In FIG. 10A, the energy source 1043A is secured to the drive housing 1012.

In one embodiment, the beam director 1043C includes a first fiber optic cable 1049A that transfers the first energy beam 1047A from the first laser diode 1045A to the slider assembly 1024 and a second fiber optic cable 1049B that transfers the second energy beam 1047B from the second laser diode 1045B to the slider assembly 1024. In FIG. 10A, each cable 1047A, 1047B is secured to the actuator arm 1030. For example, the cables 1047A, 1047B can be embedded into the tracer material on the suspension.

Figure 10B:
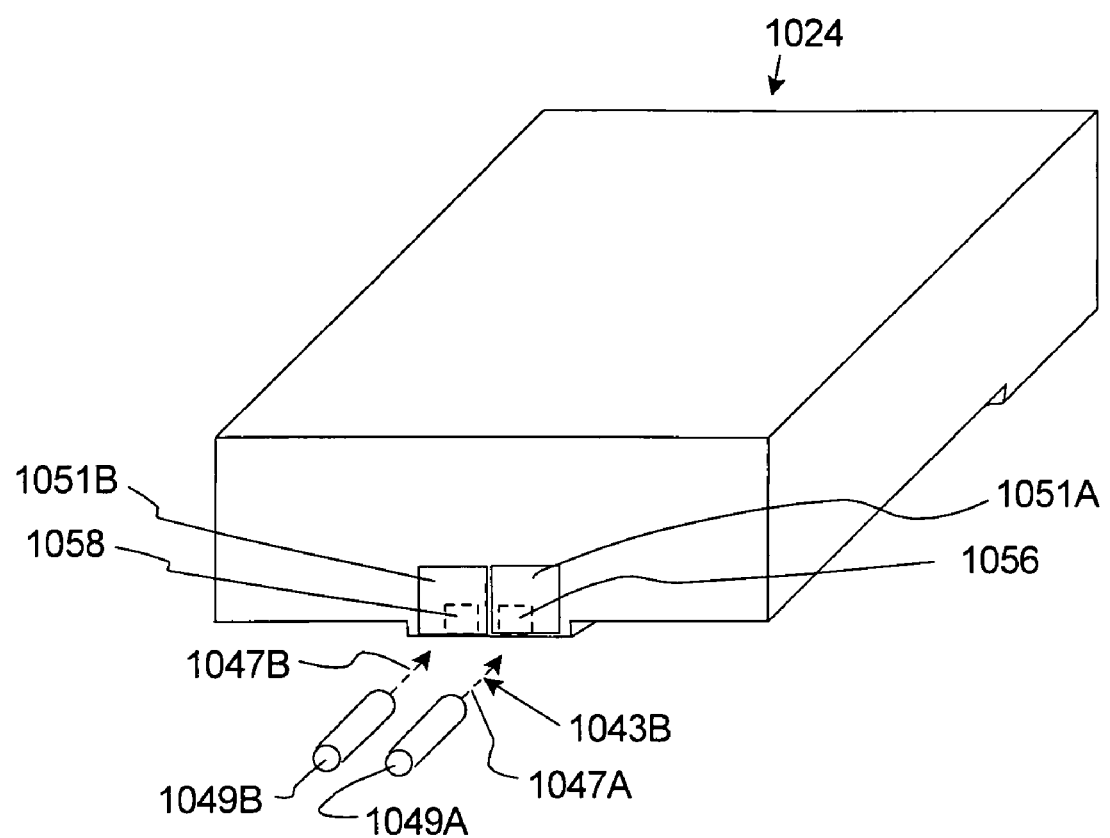
FIG. 10B is a simplified illustration of the slider assembly from FIG. 10A.

FIG. 10B is a simplified perspective view of the slider assembly 1024 and a portion of each cable 1047A, 1047B. In this embodiment, the first cable 1047A directs the first energy beam 1047A at the slider assembly 1024 near the write element 1056, and the second cable 1047B directs the second energy beam 1047B at the slider assembly 1024 near the read element 1058. With this design, the first energy beam 1047A causes the write element 1056 to move and the second energy beam 1047B causes the read element 1058 to move.

In one embodiment, the slider assembly 1024 includes a first absorber 1051A positioned near the write element 1056 and a second absorber 1051B positioned near the read element 1058. For example, each absorber 1051A, 1051B can be a material that enhances absorption of the respective energy beam 1047A, 1047B. The type of material will depend upon the wavelength of the energy beam 1047A, 1047B.

The Laser diodes can also be controlled through 1 supply line (+1 ground) by having them arranged in an antiparallel fashion. For example then a positive voltage drove Laser diode 1 and negative Voltage drives Laser diode 2.

Referring back to FIG. 1, in one embodiment, the disk drive 10 is calibrated during production or manufacturing to determine the amplitude and frequency of the current that the drive circuitry 18 should direct to each slider deformer at various times to bring the read and write head-to-disk spacing to the desired levels at the appropriate times. This information can be stored in a lookup table in the firmware of the disk drive 10. Subsequently, during operation of the drive, the information from the lookup table can be utilized to direct the current at the appropriate time to each slider deformer.

In another embodiment, the drive circuitry 18 can include a servo feedback loop that monitors the read and/or write head-to-disk spacing. This can be accomplished by utilizing one or more sensors to monitor the temperature of various locations of the slider assembly to determine the extent of the deformation. The sensor can be incorporated into the slider assembly or can be an independent structure positioned near the slider assembly.

In another embodiment, the sensor can continually monitor the strength of the magnetic field received by the read element in order to determine the extent of deformation.

Information regarding the temperature and the head-to-disk spacing is utilized by the drive circuitry 18 to adjust the current that is directed to the slider deformers during operation of the disk drive 10.

While the particular slider assembly 24 and disk drive 10, as herein shown and disclosed in detail, are fully capable of obtaining the objects and providing the advantages herein before stated, it is to be understood that they are merely illustrative of various embodiments of the invention. No limitations are intended to the details of construction or design herein shown other than as described in the appended claims.

What is claimed is:

1. A disk drive comprising:
   a rotatable storage disk; and
   a slider assembly including a slider body positioned near the storage disk, a read/write head that transfers data to the storage disk, a first slider deformer and a second deformer, wherein activation of the first slider deformer deforms a first portion of the slider body, and activation of the second slider deformer deforms a second portion of the slider body,
   wherein the slider body includes a first bearing surface and a separate second bearing surface and activation of the first slider deformer causes a protrusion of the first bearing surface and wherein activation of the second slider deformer causes a protrusion of the second bearing surface.

2. The disk drive of claim 1 wherein the slider deformers are individually controllable.

3. The disk drive of claim 1 wherein the read/write head includes a read element that is positioned near the first slider deformer and a write element that is positioned near the second slider deformer.

4. The disk drive of claim 3 wherein the read element is offset from the write element at least approximately 10 µm.

5. The disk drive of claim 1 wherein the read/write head includes a read element and a write element and wherein activation of the first slider deformer adjusts a read head-to-disk spacing of the read element and wherein activation of the second slider deformer adjusts a write head-to-disk spacing of the write element.

6. The disk drive of claim 5 wherein activation of the first slider deformer does not significantly influence the write head-to-disk spacing.

7. The disk drive of claim 5 wherein activation of the second slider deformer does not significantly influence the read head-to-disk spacing.

8. The disk drive of claim 1 wherein the read/write head includes a read element and a write element and wherein activation of the first slider deformer heats the slider body near the read element and wherein activation of the second slider deformer heats the slider body near the write element.

9. The disk drive of claim 1 wherein the read/write head includes a read element and a write element and wherein activation of the first slider deformer causes a first protrusion of the slider body near the read element and wherein activation of the second slider deformer causes a second protrusion of the slider body near the write element.

10. The disk drive of claim 1 wherein the read/write head includes a read element and a write element and wherein the read element is positioned near the first bearing surface and the write element is positioned near the second bearing surface.

11. The disk drive of claim 1 wherein the surface area of one of the bearing surfaces is greater than the surface area of the other bearing surface.

12. A disk drive comprising:
    a rotatable storage disk;
    a slider assembly including a slider body positioned near the storage disk, a read element that reads data from the storage disk, a write element that writes data to the storage disk; and
    a mover assembly that selectively and independently deforms a first potion of the slider body and a second portion of the slider body, wherein the slider body includes a first bearing surface and a separate second bearing surface and wherein the mover assembly creates a first protrusion of the first bearing surface and a second protrusion of the second bearing surface.

13. The disk drive of claim 12 wherein the mover assembly includes a first slider deformer that deforms the slider body, and a second slider deformer that deforms the slider body, the slider deformers being individually controllable.

14. The disk drive of claim 12 wherein the read element is positioned near the first portion of the slider body and the write element is positioned near the second portion of the slider body.

15. The disk drive of claim 14 wherein the read element is offset from the write element at least approximately 10 µm.

16. The disk drive of claim 12 wherein the mover assembly includes a first slider deformer, and a second slider deformer, and wherein activation of the first slider deformer adjusts a read head-to-disk spacing of the read element and where in activation of the second slider deformer adjusts a write head-to-disk spacing of the write element.

17. The disk drive of claim 16 wherein activation of the first slider deformer does not significantly influence the write head-to-disk spacing.

18. The disk drive of claim 16 wherein activation of the second slider deformer does not significantly influence the read head-to-disk spacing.

19. The disk drive of claim 12 wherein the mover assembly heats the slider body near the read element and near the write element.

20. The disk drive of claim 12 wherein the surface area of one of the bearing surfaces is greater than the surface area of the other bearing surface.

21. The disk drive of claim 12 wherein the mover assembly includes an energy source that directs an energy beam at the slider body to deform the first portion and the second portion.

22. A disk drive comprising:
a rotatable storage disk;
a slider assembly including a slider body positioned near the storage disk, a read element that reads data from the storage disk, a write element that writes data to the storage disk; and
a mover assembly that selectively and independently adjusts a read head-to-disk spacing of the read element and a write head-to-disk spacing of the write element,
wherein the slider body includes a first bearing surface and a second bearing surface and wherein the mover assembly generates a first protrusion of the first bearing surface and a second protrusion of the second bearing surface.

23. The disk drive of claim 22 wherein the mover assembly includes a first slider deformer that adjusts a read head-to-disk spacing and a second slider deformer that adjusts a write head-to-disk spacing.

24. The disk drive of claim 23 wherein activation of the first slider deformer does not significantly influence the write head-to-disk spacing.

25. The disk drive of claim 23 wherein activation of the second slider deformer does not significantly influence the read head-to-disk spacing.

26. The disk drive of claim 22 wherein the mover assembly heats the slider body near the read element and near the write element.

27. The disk drive of claim 22 wherein the surface area of one of the bearing surfaces is greater than the surface area of the other bearing surface.

28. The disk drive of claim 22 wherein the mover assembly includes an energy source that directs an energy beam at the slider body.

29. A disk drive comprising:
a rotatable storage disk;
a slider assembly including a slider body positioned near the storage disk, a read element that reads data from the storage disk, a write element that writes data to the storage disk; and
a mover assembly that selectively directs an energy beam at the slider body wherein the mover assembly deforms the slider body.

30. The disk drive of claim 29 wherein the mover assembly adjusts a read head-to-disk spacing of the read element and a write head-to-disk spacing of the write element.

31. The disk drive of claim 29 wherein the mover assembly is positioned away from the slider body.

32. The disk drive of claim 29 wherein the mover assembly includes a beam director that directs the energy beam at the slider body.

33. The disk drive of claim 29 wherein the mover assembly heats the slider body near the read element and near the write element.

34. A method for accurately transferring data between a read/write head and a storage disk, the read/write head including a read element and a write element, the method comprising the steps of:
selectively adjusting a read head-to-disk spacing of the read element including the step of directing a first energy beam at a slider body; and
selectively adjusting a write head-to-disk spacing of the write element including the step of directing a second energy beam at the slider body.

35. The method disk drive of claim 34 where in the step of selectively adjusting a read head-to-disk spacing includes the step of deforming the slider body with a first slider deformer.

36. The method disk drive of claim 34 where in the step of selectively adjusting a write head-to-disk spacing includes the step of deforming the slider body with a second slider deformer.

37. The method disk drive of claim 34 where in the step of selectively adjusting a read head-to-disk spacing includes the step of creating a first protrusion on the slider body, and the step of selectively adjusting a write head-to-disk spacing includes the step of creating a second protrusion on the slider body that is spaced apart from the first protrusion.

38. The method disk drive of claim 34 where in the step of selectively adjusting a read head-to-disk spacing includes the step of heating a first portion of the slider body and the step of selectively adjusting a write head-to-disk spacing includes the step of heating a second portion of the slider body.

* * * * *